United States Patent [19]
Leonarduzzi

[11] 3,909,077

[45] Sept. 30, 1975

[54] PIVOT ASSEMBLY MOUNTING APPARATUS

[75] Inventor: Felix L. Leonarduzzi, St. Joseph, Mich.

[73] Assignee: Leco Corporation, St. Joseph, Mich.

[22] Filed: Aug. 20, 1973

[21] Appl. No.: 390,091

[52] U.S. Cl. ................... 308/2 R; 267/160; 85/61
[51] Int. Cl. ............................................. F16c 11/00
[58] Field of Search ......... 85/61, 45; 308/2 R, 2 A; 403/362; 267/160; 177/DIG. 9, 246, 196

[56] References Cited
UNITED STATES PATENTS

| | | | |
|---|---|---|---|
| 791,548 | 6/1905 | Fischer | 403/362 |
| 2,779,643 | 1/1957 | Firth | 403/362 |
| 2,830,635 | 4/1958 | Thorstens | 85/1 SS |
| 3,181,851 | 5/1965 | Troeger | 308/2 |
| 3,501,182 | 3/1970 | Buchsbaum | 403/362 |
| 3,730,569 | 5/1973 | Feinler | 403/362 |

FOREIGN PATENTS OR APPLICATIONS

| | | | |
|---|---|---|---|
| 671,087 | 4/1952 | United Kingdom | 85/45 |

*Primary Examiner*—Charles J. Myhre
*Assistant Examiner*—R. H. Lazarus
*Attorney, Agent, or Firm*—Price, Heneveld, Huizenga & Cooper

[57] ABSTRACT

A flexible pivot is mounted to each of a pair of members to permit restrained relative rotation between the members by providing apertures in each of the members into which opposite ends of the pivot are mounted. A threaded aperture is provided in communication with the inner surface of each of the apertures and a threaded set screw having a deformable head is threaded into each member and engages the pivot with a predetermined torque ascertained by the breakaway torque between the head and a tool used to tighten the set screw. By employing a set screw having a deformable head, a controlled holding torque which cannot be exceeded is assured to prevent damage to the fragile pivot assembly while at the same time securing the flexible pivot in position in each of the members.

7 Claims, 7 Drawing Figures

PIVOT ASSEMBLY MOUNTING APPARATUS

BACKGROUND OF THE INVENTION

The present invention relates to apparatus for mounting a flexible pivot assembly to a member and more specifically to an improved mounting arrangement whereby damage to a fragile pivot assembly is prevented.

When mounting flexible pivot assemblies which are extremely fragile and are intended for providing a restrained rotating coupling between a pair of relatively lightweight members, several mounting techniques have been employed with varying degrees of success. One method has been to provide a screw clamp arrangement whereby an aperture receiving the cylindrical shaped flexible pivot is slotted and a screw extended transversely through the legs so formed and tightened until the aperture diameter contracts and securely engages the flexible pivot. Also, pivot receiving apertures have been provided with threaded set screw apertures communicating therewith such that a set screw can be inserted to engage the flexible pivot when positioned in the pivot receiving aperture.

Although both of these techniques will provide adequate holding forces for a flexible pivot assembly, the assembly, which is extremely fragile, can be easily damaged by excessive torque applied to the clamping screw or set screw thereby necessitating extremely careful assembly techniques requiring either special tools or very careful manufacturing techniques, either of which tends to raise the cost of assembly of articles employing flexible pivots.

Other mounting methods which provide less risk of damaging the flexible pivots have been employed and include the use of tangential engaging pins which fit through a member in which the flexible pivot is mounted in a manner to engage the edge of the flexible pin and prevent its movement once inserted into the member. Although these and other techniques tend to prevent the damage to the flexible pivot which can easily occur with the screw type mounting systems, such systems require careful machining and special pins for holding the flexible pivots in position, both of which increase the manufacturing cost of an item employing flexible pivots mounted in this manner.

One application of flexible pivots manufactured by the Bendix Corporation and identified as Model Nos. 5004-800, is in a balance beam assembly for a laboratory balance. In such a beam assembly, beam members must be allowed to freely pivot with respect to interconnected beam members through a limited range and the use of flexible pivot assemblies is ideal in such an application. It has been found, however, that prior existing mounting techniques have greatly incresed the cost of manufacturing the beam members due to the special machining required or alternatively, the existing mounting methods suggested by the manufacturer of the flexible pivots could lead to damage of the pivots which are relatively expensive items.

Thus there exists a need for a technique for mounting flexible pivot assemblies in, for example, laboratory balance beam assemblies such that the balance beam members themselves can be of relatively simple construction and, therefore, reduced cost, and such that the beam members can be interconnected by flexible pivots in an inexpensive manner which prevents damage to the fragile flexible pivots during installation.

SUMMARY OF THE INVENTION

It has been discovered that by providing a beam member with a slightly oversized aperture for receiving a flexible pivot and a threaded aperture extending transversely into the pivot receiving aperture, and by using a set screw having a deformable head with a corresponding tool which will slip with respect to the head once a breakaway torque has been reached; flexible pivots can be mounted to interconnect balance beam assemblies. Such structure virtually eliminates the problem of damaging the flexible pivots which too frequently occurs when a conventional set screw is employed and permits a reduction in the complexity of the beam assembly members themselves thereby greatly reducing the cost of a balance beam assembly employing interconnecting flexible pivots.

Mounting apparatus embodying the present invention includes a support member having an article receiving bore and means communicating with a wall of the bore to permit a holding member having a deformable tool engaging member to be fitted into the support member and communicate with the bore to secure an object fitted within the bore.

The method of the present invention includes the steps of providing a set screw with a deformable head for holding an object in place and tightening the screw in place with a tool until the breakaway force is reached causing the tool to slip in the head of the screw at a predetermined holding force on the object.

It is an object of the present invention to provide an improved mounting system for fragile objects fitted within a support member by employing a set screw having a deformable head which provides a breakaway torque limiting the pressure of the set screw against the object.

Another object of the present invention is to provide an improved mounting apparatus for preventing damage to an article held by a support member.

Still a further object of the present invention is to provide improved mounting apparatus for coupling a flexible pivot to a balance beam member.

Another object of the present invention is to provide an improved method of mounting fragile articles in an article holding member.

It is still a further object of the present invention to provide an improved balance beam structure of greater simplicity and reduced cost.

These and other objects of the present invention will become apparent upon reading the following description thereof together with the accompanying drawings in which:

DETAILED DESCRIPTION OF THE PREFERRED EMBODIMENT

Although the method and apparatus of the present invention has universal application to the mounting of fragile articles in either open or closed apertures or recesses, the invention will be discussed in the environment of the mounting of a fragile flexible pivot assembly to the ends of balance beam members of the type employed in an electronic balance as disclosed in U.S. Pat. application Ser. No. 333,049, filed on Feb. 16, 1973 and assigned to the present assignee.

Figure 2:
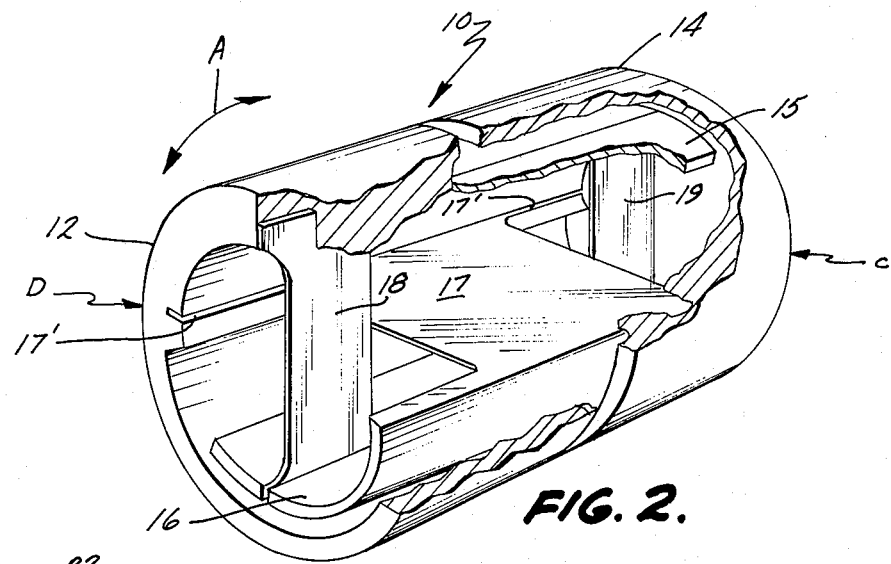
FIG. 2 is an enlarged fragmentary perspective view of a flexible pivot.

A flexible pivot 10 of the type identified above is shown in FIG. 2 and comprises a first cylindrical member (or collar) 12 and a second cylindrical member 14 of substantially the same diameter and configuration. An arcuate shaped cylindrical segment 16 extends within and along the members 12 and 14 and is coupled to members 12 and 14 by means of a resilient thin-walled interconnecting member 17 positioned approximately midway between members 12 and 14 in slots 17'. Flexible end segment 18 extends orthogonally to member 17 and between segment 16 and member 12, and flexible end segment 19 extends orthogonally to member 17 and between member 16 and a second arcuate cylindrical segment 15 as seen in FIG. 2.

Such flexible pivots are commercially available and permit the relatively free rotation within a restrained arc between members 12 and 14 as indicated by arrow A. Such pivot assemblies, however, are extremely fragile and the mounting of the pivots requires extreme car to prevent damaging thereof when the pivots are used in interconnecting members of an additional assembly.

Figure 1:
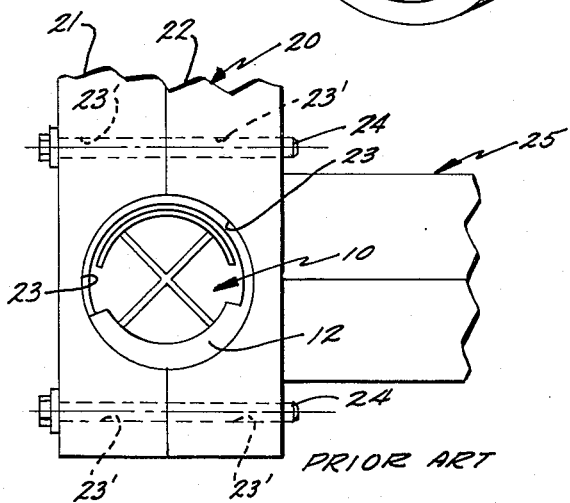
FIG. 1 is a fragmentary end elevation of a flexible pivot coupling the ends of a pair of orthogonal beam members in accordance with the prior art.

One method of mounting the flexible pivots to the ends of a pair of beam members of a balance beam and which has been used, is shown in FIG. 1. In the figure, a flexible pivot assembly 10 has collar 12 mounted to a first beam member 20 and the remaining collar 14 (not shown in FIG. 2) similarly mounted to a second beam member 25. As seen in this figure, beam member 20 is a composite of two halves 21 and 22, each of which includes a semicircular pivot receiving recess 23 and bolt receiving apertures 23' for receiving therein a pair of mounting bolts 24 which secure the beam halves together to hold the pivot assembly within the apertures 23. In such an arrangement, the apertures must be carefully machined to a diameter approximately 0.0005 inches smaller than the diameter of the flexible pivot such that when screws 24 are tightened to secure the interconnecting faces of beam halves 21 and 22, the flexible pivot will not be damaged and yet will be securely held within the apertures.

Beam member 25 is similarly constructed to mount collar 14 of the flexible pivot to the beam member 25 thereby permitting the relative rotation of members 20 and 25 by virtue of the pivot assembly. It is seen that in such a mounting arrangement, the beam members must be machined not only to include a relatively critically dimensioned arcuate segments, but additionally must be split with flat facing surfaces to permit insertion of the flexible pivots and the subsequent engagement and tightening of the beam halves to hold the flexible pivot in place in the beam. Such an arrangement becomes relatively costly due to the machining required and additional fastening members necessary. As discussed earlier, other available mounting arrangements, are either equally expensive or provide an intolerable amount of damage to the pivot during manufacturing which prevents their commercial use for interconnecting beam members.

Figure 3:
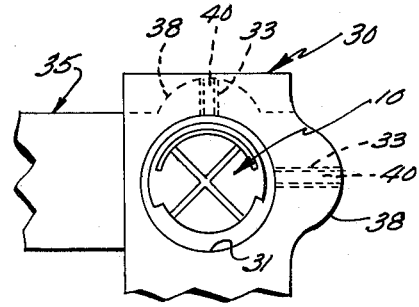
FIG. 3 is a fragmentary end elevation view showing the mounting of a paiur of beam members in accordance with the present invention.
Figure 4:
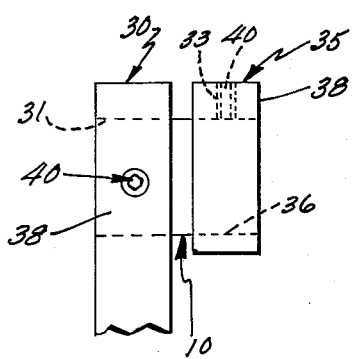
FIG. 4 is a fragmentary right side elevation of the structure shown in FIG. 3.

Referring now to FIGS. 3–7, there is shown a mounting apparatus and method which greatly reduces the manufacturing cost of the beam assembly as well as virtually eliminates the possiblity of damage to a flexible pivot when employed to interconnect two beam members. In FIGS. 3 and 4 there is shown a first beam member 30 and a second beam member 35 rotatably coupled together by means of a flexible pivot 10, inserted within an aperture 31 of beam 30 and corresponding aperture 36 for receiving the flexible pivot member for beam 35. Each of the beam members includes an enlarged portion or boss 38 as best seen in FIG. 3 which is adjacent the pivot receiving apertures 31 and 36 to provide a reinforced area into which there is formed a threaded aperture 33 for receiving therein a threaded screw 40 having a deformable head such that the screw can be tightened to only a predetermined torque which prevents damage to the flexible pivot. As seen in FIGS. 3 and 4 the beam members are single piece members which are of greatly simplified structure and can be machine stamped. The apertures 31 and 36 need only be slightly larger (approximately 0.0005 inches) than the pivot diameter and are not as critical.

In the preferred embodiment, the socket head set screws were of molded nylon manufactured by the Gries Company and were 6–32 screws ⅛ inch in length. It is to be understood that although these particular screws are used to provide holding means in the preferred embodiment illustrated, the invention may be practiced by using other types of holding means with a deformable tool engaging member which provides break-away contact between the holding means and the tool at a desired holding force (or within a range of forces) against an object to be held.

Figures 5, 6:
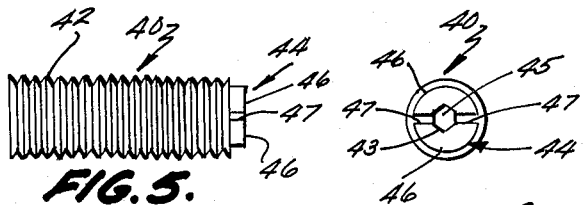
FIG. 5 is an enlarged side elevational view, of a set screw employed in the present invention.
FIG. 6 is a right end view of the set screw shown in FIG. 5.

The screws 40 comprises as best seen in FIGS. 5 and 6, a threaded shank 42 and a head 44 which includes a hexagonal shaped recess 45 and a pair of arcuate shoulders 46 defining a slot 47 therebetween as best seen in FIG. 6. Although the preferred embodiment employed molded nylon screws, other plastic materials such as polyurethane or other polymeric materials can be employed although the screws may have an oval flat cone type of end as opposed to the plain end of the screw of the preferred embodiment.

Figure 7:
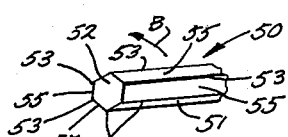
FIG. 7 is a fragmentary, enlarged perspective view of a tool used with the set screw shown in FIGS. 3 through 6.

A tool used for inserting and elevational the screw in each of the pair 35 is shown in FIG. 7. The tool 50 includes a shank 51 having a hex head 52 corresponding in size to the hex recess 45 in the set screws 40. The tool has a suitable handle (not shown) for applying torque to shank 51 when the tool is inserted into the set screw.

In operation, the flex pivot is inserted into the pivot receiving bores 31 of beam 30 and 36 of beam 35 and a set screw 40 is threaded into the apertures 33 of each of the beam members and tightened with a clockwise motion with the tool 50 (indicated by arrow B in FIG. 7) until the end of the screw remote from its head contacts the flex pivot with the reactive pressure causing the wrench to slip within the head at the breakaway torque which, in the preferred embodiment, was from 7 to 8 inch ounces. The side walls 43 of the hex shaped recess deform by the pressure exerted by wrench 50 to permit, at a breakaway torque, the edges 53 between flats 55 on shank 51 to slip along walls 43 of recess 45 thereby limiting the torque which can be applied to the pivot by screw 40. The term deformable as used herein broadly refers to this type deformity of the set screw as well as other movement, flexing, breaking or plastic or elastic deformation of the holding member which likewise limits the force applied to the member by a tool with a corresponding shaped engaging member.

In the preferred embodiment the set screws are securely tightened against the flexible pivot assembly 10 to hold he assembly in position without damaging the assembly. It has been determined that a maximum torque of approximately 16 inch ounces at points C or D of the flexible pivot (as seen in FIG. 2), can be tolerated without bending or otherwise damaging the pivots. The other axis of the pivots will not withstand any significant pressure without deforming the pivots and interfering with their operation. The lower torque limit required to secure the flex pivot within the pivot receiving bores of the beams is approximately 4 inch ounces while, as noted earlier, the maximum is approximately 16 inch ounces.

These figures represent the minimum and maximum torques usable with the particular flexible pivot described and it is understood that this range may vary depending upon the particular article being held in the support member. It is also understood that any deformable type of socket head or other type of head other than the hex head socket shown in FIG. 6 may be employed to provide a slip torque in conjunction with a fastening tool within the acceptable range, it being necessary only that the head provide a deformable surface which permits the tightening tool to slip therein at a torque within the desired range which is both adequate to hold the article in place but which will not damage the article.

It will become apparent to those skilled in the art that various modifications to the present invention can be made but which will fall within the scope and spirit of the present invention as defined by the appended claims.

The embodiments of the invention in which an exclusive property or privilege is claimed are defined as follows.

1. An electronic balance including a balance beam member having a bore for receiving a relatively fragile flexible pivot and including a threaded aperture communicating with said bore; and a threaded holding member threadably fitted in said aperture to engage said flexible pivot when said pivot is fitted in said bore to secure said pivot therein, said holding member including a deformable portion which deforms to allow a tool to tighten said holding member with only a limited force applied to hold said pivot to said beam member.

2. The apparatus as defined in claim 1 wherein said holding member comprises a set screw and wherein said deformable portion is a tool engaging portion comprising a socket head such that slippage occurs between said tool engaging portion and said tool at a predetermined torque.

3. The apparatus as defined in claim 2 wherein said screw is manufactured of nylon.

4. The apparatus as defined in claim 3 wherein said socket head is hex-shaped.

5. The apparatus as defined in claim 4 wherein said beam member includes a boss adjacent said pivot receiving bore and through which said threaded aperture extends.

6. The apparatus as defined in claim 5 wherein slippage occurs at a torque of approximately 8 inch ounces.

7. An electronic balance including beam assembly in which two members are pivotally coupled by a relatively fragile flexible pivot assembly, improved means for securing said flexible pivot assembly to said members comprising:

a pair of beam members each including an oversized bore for receiving opposite ends of said flexible pivot assembly, each beam member including a threaded aperture extending through said beam orthogonally with respect to said bore and in communication with said bore; and a set screw having a deformable tool engaging head which permits slippage between a tightening tool and said head at a predetermined torque to limit the force of said set screw against said flexible pivot assembly thereby preventing damage to said flexible pivot assembly.

* * * * *